United States Patent
Seo (10) Patent No.: US 12,548,479 B2
(45) Date of Patent: Feb. 10, 2026

(54) TAPE HAVING DIFFERENT ADHESIVE STRENGTHS ON BOTH SIDES AND BULLETIN BOARD USING SAME

(71) Applicant: Jung Tak Seo, Osan-si (KR)

(72) Inventor: Jung Tak Seo, Osan-si (KR)

( * ) Notice: Subject to any disclaimer, the term of this patent is extended or adjusted under 35 U.S.C. 154(b) by 174 days.

(21) Appl. No.: 18/563,386

(22) PCT Filed: Jun. 16, 2022

(86) PCT No.: PCT/KR2022/008517
§ 371 (c)(1),
(2) Date: Nov. 22, 2023

(87) PCT Pub. No.: WO2022/270820
PCT Pub. Date: Dec. 29, 2022

(65) Prior Publication Data
US 2024/0212532 A1    Jun. 27, 2024

(30) Foreign Application Priority Data
Jun. 23, 2021    (KR) ........................ 10-2021-0081637

(51) Int. Cl.
*G09F 15/00*    (2006.01)
*C09J 7/20*    (2018.01)

(52) U.S. Cl.
CPC ............ *G09F 15/0018* (2013.01); *C09J 7/20* (2018.01); *C09J 2301/124* (2020.08)

(58) Field of Classification Search
CPC ............ G09F 15/0018; C09J 2301/124; C09J 2301/1242
See application file for complete search history.

(56) References Cited

U.S. PATENT DOCUMENTS

| 2,532,011 | A | * | 11/1950 | Hendricks | .................. C09J 7/21 |
|  |  |  |  |  | 525/61 |
| 2,914,873 | A | * | 12/1959 | Brennan | .................. G09F 7/12 |
|  |  |  |  |  | 40/594 |
| 4,911,964 | A | * | 3/1990 | Corbo | ..................... E06B 3/285 |
|  |  |  |  |  | 428/354 |

(Continued)

FOREIGN PATENT DOCUMENTS

| KR | 20-0173664 Y1 | 3/2000 |
| KR | 10-2001-0002697 A | 1/2001 |

(Continued)

OTHER PUBLICATIONS

International Search Report for PCT/KR2022/008517 mailed Sep. 30, 2022 from Korean Intellectual Property Office.

*Primary Examiner* — Gary C Hoge
(74) *Attorney, Agent, or Firm* — Revolution IP, PLLC (57) ABSTRACT

A tape used to attach a notice to an object through an adhesive strength includes: a first side attached to the object through a first adhesive strength; and a second side which has a second adhesive strength weaker than the first adhesive strength and to which the notice is attached, wherein, with such a configuration, using the tape having different adhesive strengths on both sides, the first side with the stronger adhesive strength is attached to the object, and the notice is attached to the second side with the weaker adhesive strength, and thus there is an effect that the tape can be attached to various objects to post a notice.

4 Claims, 6 Drawing Sheets

(56) References Cited

U.S. PATENT DOCUMENTS

| | | | | |
|---|---|---|---|---|
| 5,297,768 | A * | 3/1994 | Denton | B41J 29/15 |
| | | | | 248/458 |
| 5,702,555 | A * | 12/1997 | Caudal | B65H 19/29 |
| | | | | 156/289 |
| 5,775,489 | A * | 7/1998 | Vickers | B65D 5/5035 |
| 5,775,919 | A * | 7/1998 | Gardner | A47B 97/001 |
| | | | | 40/594 |
| 2006/0084193 | A1* | 4/2006 | Hwang | G02F 1/133305 |
| | | | | 438/149 |
| 2008/0010885 | A1* | 1/2008 | Herb | G09F 1/12 |
| | | | | 40/773 |
| 2010/0029503 | A1* | 2/2010 | Nomura | B01F 33/30 |
| | | | | 506/15 |
| 2014/0303521 | A1* | 10/2014 | Nakamura | A61B 7/003 |
| | | | | 600/300 |
| 2015/0200416 | A1* | 7/2015 | Ajima | H01M 4/0435 |
| | | | | 429/94 |
| 2019/0211237 | A1* | 7/2019 | Kawazoe | C09J 11/08 |
| 2020/0277518 | A1* | 9/2020 | Arai | F16B 47/00 |
| 2021/0101733 | A1* | 4/2021 | Hunter | B65D 25/20 |

FOREIGN PATENT DOCUMENTS

| | | |
|---|---|---|
| KR | 20-0258147 Y1 | 12/2001 |
| KR | 20-0349352 Y1 | 5/2004 |
| KR | 10-0708215 B1 | 4/2007 |
| KR | 10-0801222 B1 | 2/2008 |
| KR | 20-2011-0010938 U | 11/2011 |
| KR | 10-1099323 B1 | 12/2011 |
| KR | 20-2012-0001059 U | 2/2012 |

\* cited by examiner

TAPE HAVING DIFFERENT ADHESIVE STRENGTHS ON BOTH SIDES AND BULLETIN BOARD USING SAME

TECHNICAL FIELD

The present disclosure relates to a tape having different adhesive strengths on both sides and a bulletin board using the same, and more particularly, to a tape having different adhesive strengths on both sides and a bulletin board using the same for fixing a notice through an adhesive strength to post the notice on an object.

BACKGROUND ART

Generally, a bulletin board refers to a board on which writing, drawings, pictures, and the like to be widely spread are attached and is an installation that allows an installer to inform other users of certain content by displaying content of a notice using writing, drawings, or the like.

A bulletin board is mostly installed on a street where users pass to allow many people to see the bulletin board.

In particular, a bulletin board is mostly used in botanical gardens, parks, learning centers, in-school facilities, and the like and provides pictures, drawings, or the like of the corresponding facility as well as a written introduction thereof to users while also serving as a signpost.

Also, due to an increase in large-sized, modernized buildings, a bulletin board is used to encourage information sharing and use of various forms of information by ordinary people by posting various notices to provide guides, announcements, or various forms of information in typical buildings.

On a typical bulletin board, various notices are fixed using a support body and posted to the outside for use of information.

However, despite being able to firmly fix the notices, the support body has problems in that it makes it inconvenient and time-consuming to replace the notices.

Also, the support body has a problem in that it is fixed to the bulletin board or can be used only on that bulletin board.

Related art documents of the art to which the present disclosure pertains include Korean Utility Model Registration No. 20-0349352, Korean Utility Model Application No. 20-2001-0028259, and Korean Patent Registration No. 10-0708215.

DISCLOSURE

Technical Problem

The present disclosure is directed to providing a tape that allows a notice to be attached to various objects and is easy to attach or detach to replace a notice, and a bulletin board using the tape.

Technical Solution

An exemplary embodiment of the present disclosure provides a tape having different adhesive strengths on both sides that is used to attach a notice to an object through an adhesive strength, the tape including: a first side attached to the object through a first adhesive strength; and a second side which has a second adhesive strength weaker than the first adhesive strength and to which the notice is attached.

An exemplary embodiment of the present disclosure provides a bulletin board using a tape having different adhesive strengths on both sides, the bulletin board including the tape and a plate on which the tape is attached to positions spaced apart at a predetermined distance in a vertical direction along a transverse direction of a front surface of the plate and on which the notice is attached at equal intervals on the tape.

Also, as the tape, a pair of pieces of tape spaced apart from each other in the vertical direction may be further attached in the vertical direction.

Also, a bending piece may be formed on each corner of the second side in order to be bent and attached to each corner of the notice adjacent thereto.

In addition, a seating groove may be formed on the front surface of the plate to enable the tape to be seated.

Advantageous Effects

According to a tape having different adhesive strengths on both sides and a bulletin board using the same according to the present disclosure, using the tape having different adhesive strengths on both sides, a first side with a stronger adhesive strength is attached to an object, and a notice is attached to a second side with a weaker adhesive strength, and thus there is an effect that the tape can be attached to various objects to post a notice.

Also, pieces of the tape are attached to the bulletin board while being spaced apart from each other in a vertical direction to fix an upper end and a lower end of the notice, and thus there is an effect of allowing the notice to be firmly fixed and promptly attached or detached.

MODES OF THE INVENTION

Advantages and features of the present disclosure and methods of achieving the same will become apparent from embodiments described in detail below with reference to the accompanying drawings.

However, the present disclosure is not limited to the embodiments disclosed below and may be implemented in various different forms. The embodiments herein are only provided to make the disclosure complete and completely inform those of ordinary skill in the art to which the present disclosure pertains of the scope of the disclosure, and the present disclosure is only defined by the scope of the claims. Throughout the specification, like reference numerals refer to like components.

Hereinafter, the present disclosure will be described with reference to the drawings for describing a tape having different adhesive strengths on both sides and a bulletin board using the same according to embodiments of the present disclosure.

Figure 1:
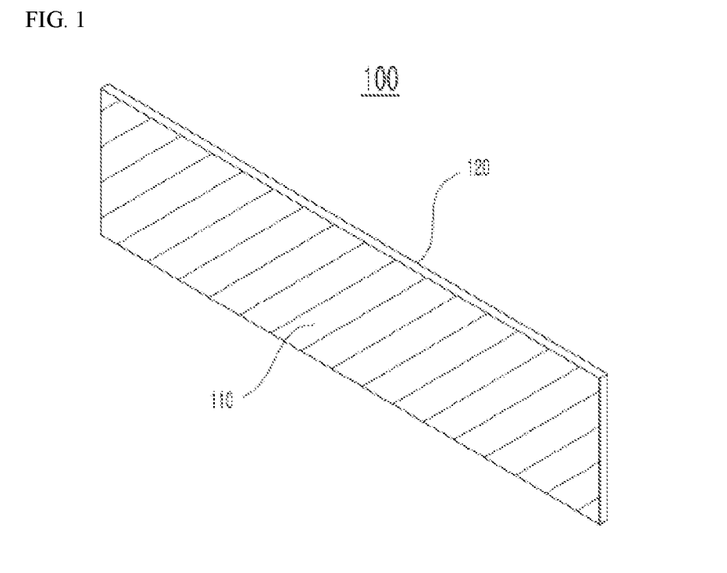
FIG. 1 is a perspective view of a tape having different adhesive strengths on both sides according to a first embodiment of the present disclosure.
Figure 2:
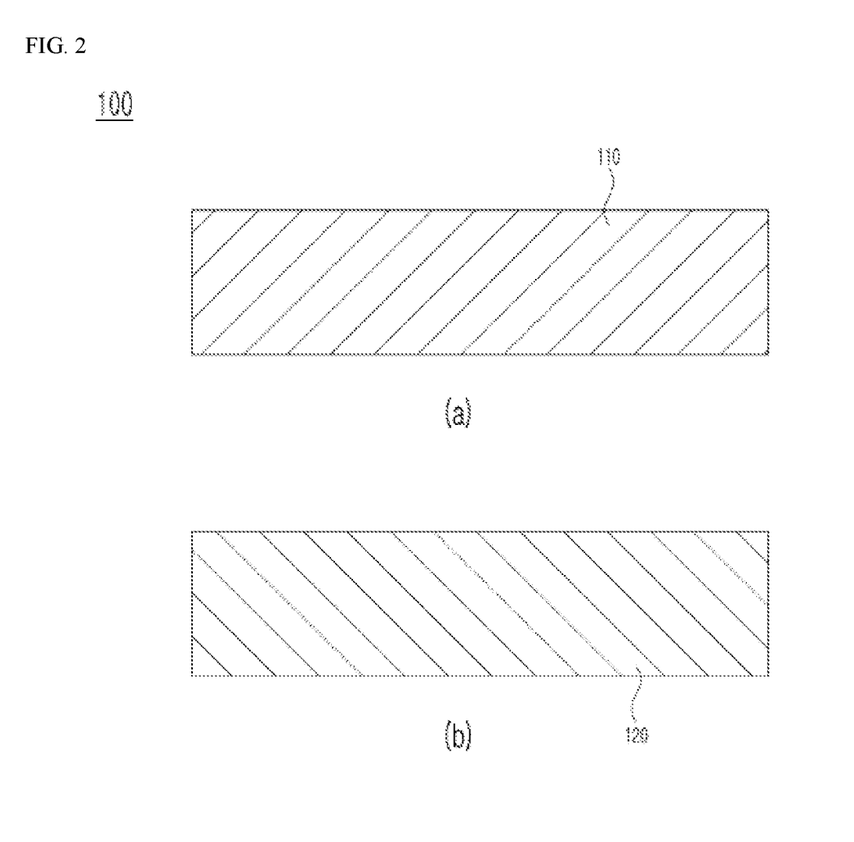
FIG. 2 shows a front view and a rear view of FIG. 1 according to the first embodiment of the present disclosure.
Figure 3:
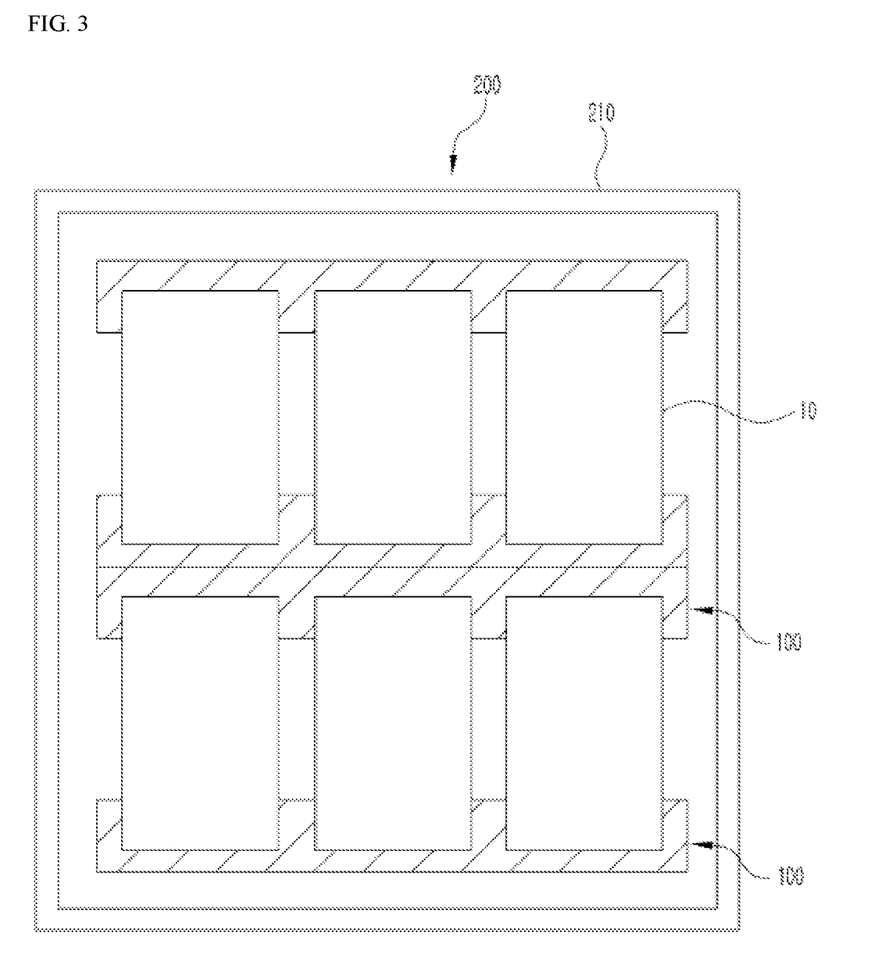
FIG. 3 is a use state view of a bulletin board according to the first embodiment of the present disclosure.

FIG. 1 is a perspective view of a tape having different adhesive strengths on both sides according to a first embodiment of the present disclosure, FIG. 2 shows a front view and a rear view of FIG. 1 according to the first embodiment of the present disclosure, and FIG. 3 is a use state view of a bulletin board according to the first embodiment of the present disclosure.

Referring to FIGS. 1 to 3, the tape having different adhesive strengths on both sides and the bulletin board using the same according to the present embodiment allow a notice to be promptly attached or detached using the tape having different adhesive strengths on both sides.

A tape 100 having different adhesive strengths on both sides according to the present embodiment that can provide such an effect includes a first side 110 and a second side 120 in order to be attached to an object or allow a notice 10 to be attached thereto through adhesive strengths of both sides.

The first side 110 is attached to various objects such as a wall or glass and has a first adhesive strength.

For example, the first adhesive strength of the first side 110 may be formed to not change according to season or time and not remain on a surface to which the first side 110 is adhered.

The second side 120 is attached to the notice 10 and has a second adhesive strength weaker than the first adhesive strength of the first side 110.

For example, the second adhesive strength of the second side 120 may be formed to allow the notice 10 to be attached and detached several times.

Here, since the first side 110 has an adhesive strength stronger than the adhesive strength of the second side 120, even when the notice 10 is detached, the first side 110 remains attached and fixed to the object.

A bulletin board 200 using the tape having different adhesive strengths on both sides according to the present embodiment includes the tape 100 and includes a plate 210.

On the plate 210, the tape 100 is attached to positions spaced apart at a predetermined distance in a vertical direction along a transverse direction.

Here, as pieces of the tape 100 are spaced apart in the vertical direction, an upper end and a lower end of the notice 10 are attached thereto.

Also, on the plate 210, pieces of the tape 100 spaced apart in the vertical direction may be further attached in the vertical direction.

Here, since a plurality of pieces of the tape 100 are disposed in the vertical direction, a plurality of notices 10 may be posted in the longitudinal direction as well as the transverse direction.

Figure 4:
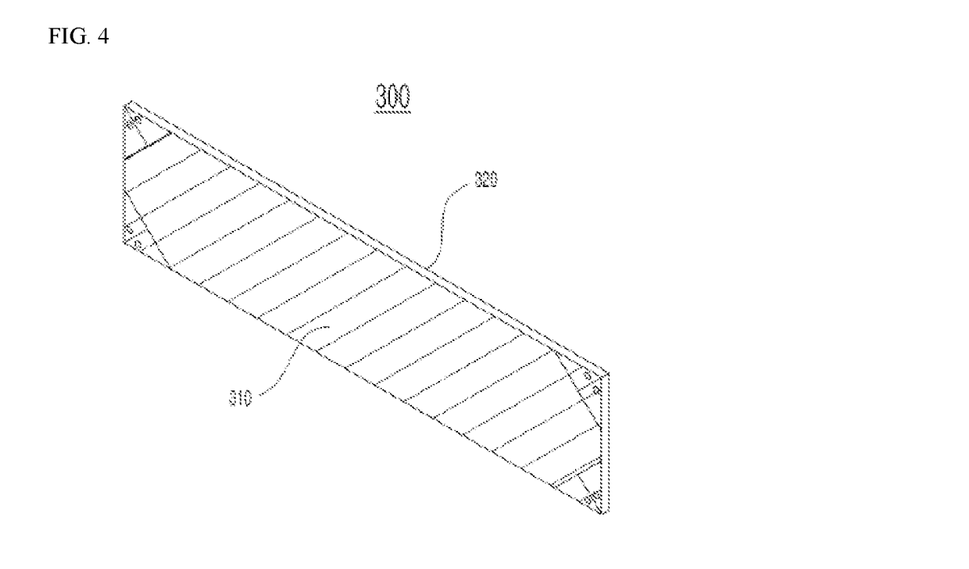
FIG. 4 is a perspective view of a tape having different adhesive strengths on both sides according to a second embodiment of the present disclosure.
Figure 5:
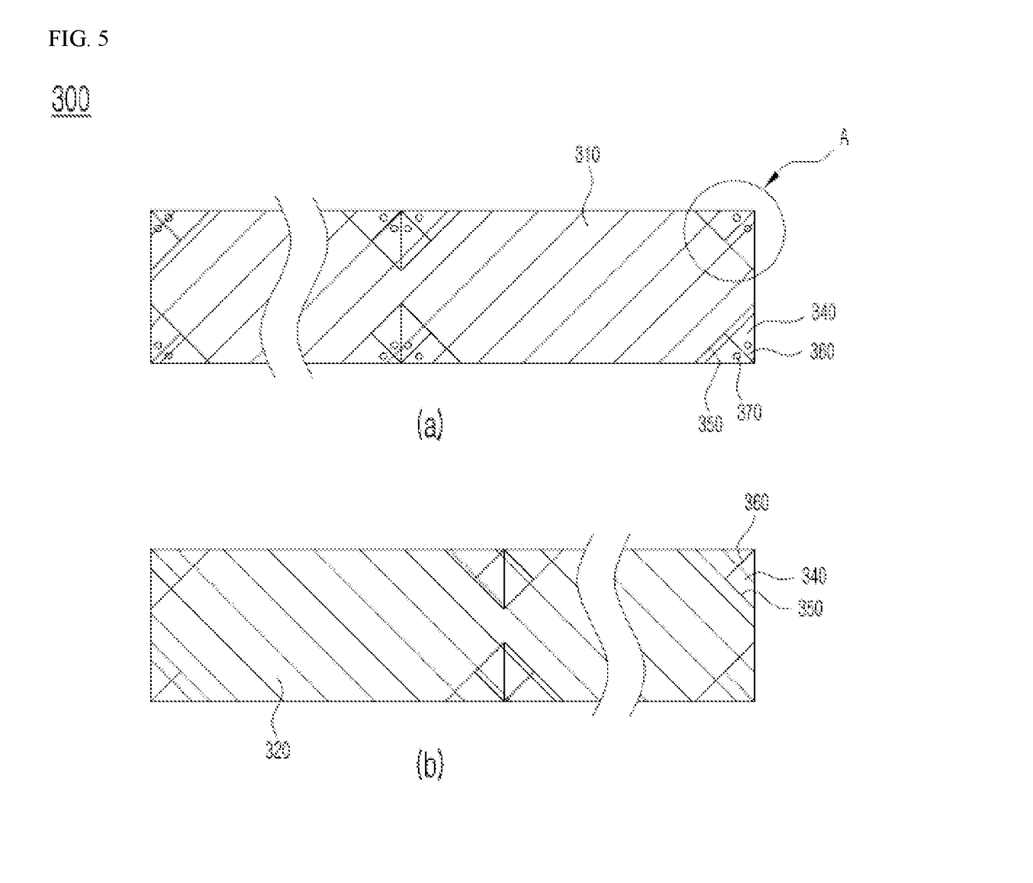
FIG. 5 shows a front view and a rear view of FIG. 4 according to the second embodiment of the present disclosure.
Figure 6:
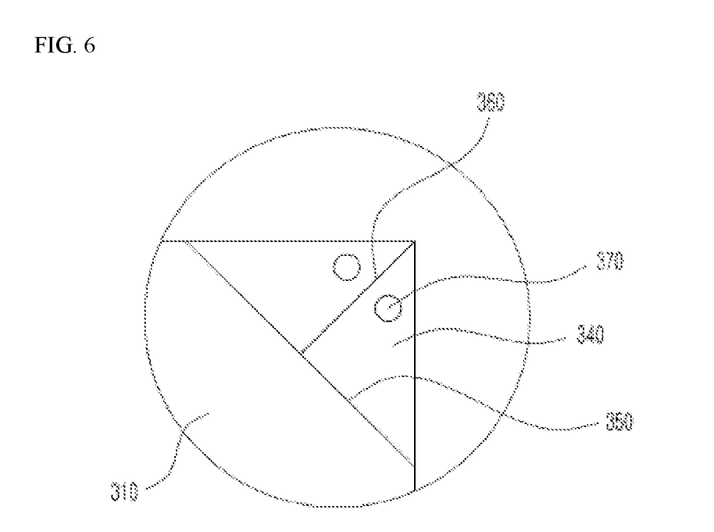
FIG. 6 is an enlarged view of portion A of FIG. 5 according to the second embodiment of the present disclosure.
Figure 7:
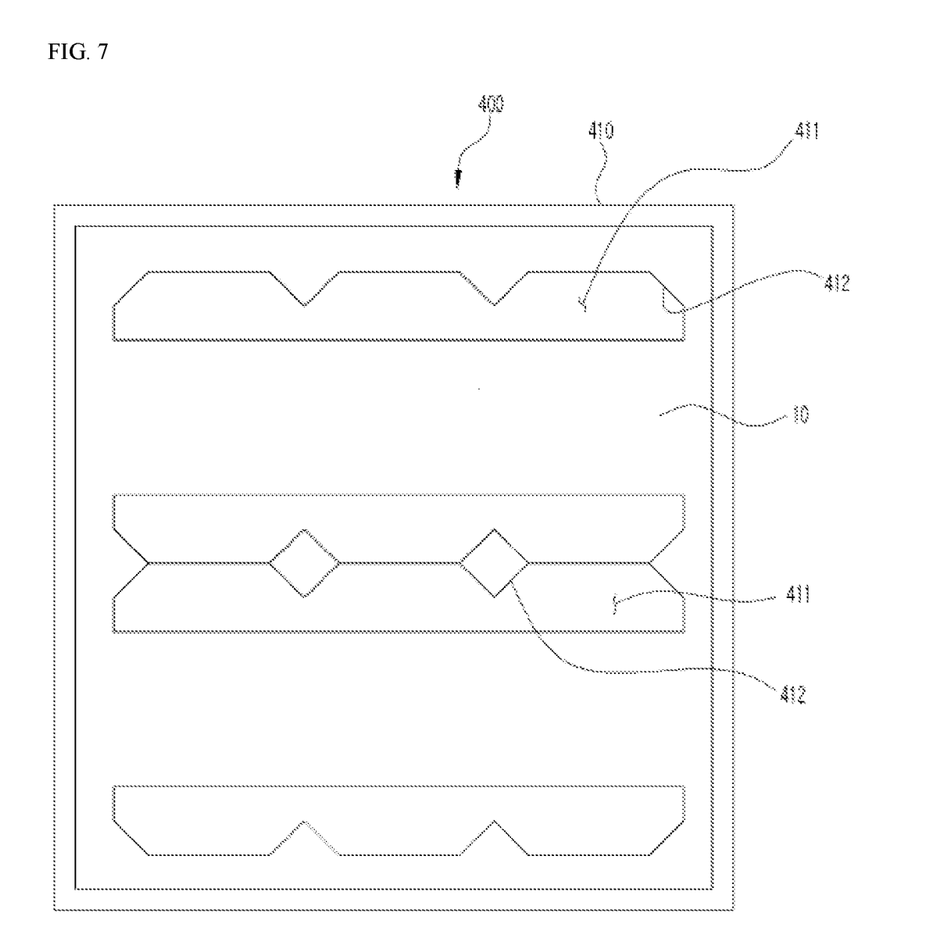
FIG. 7 is a front view of a bulletin board according to the second embodiment of the present disclosure.
Figure 8:
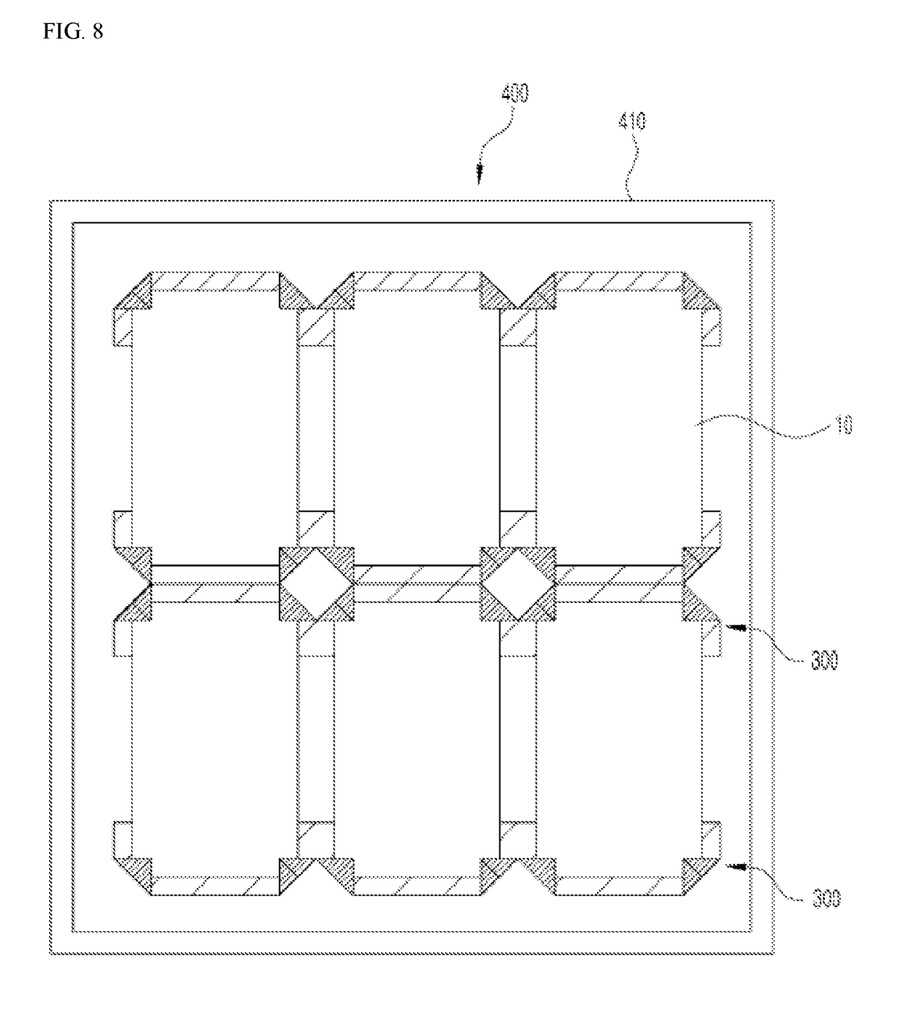
FIG. 8 is a use state view of the bulletin board according to the second embodiment of the present disclosure.

FIG. 4 is a perspective view of a tape having different adhesive strengths on both sides according to a second embodiment of the present disclosure, FIG. 5 shows a front view and a rear view of FIG. 4 according to the second embodiment of the present disclosure, FIG. 6 is an enlarged view of portion A of FIG. 5 according to the second embodiment of the present disclosure, FIG. 7 is a front view of a bulletin board according to the second embodiment of the present disclosure, and FIG. 8 is a use state view of the bulletin board according to the second embodiment of the present disclosure.

A tape 300 having different adhesive strengths on both sides according to the present embodiment includes a first side 310 and a second side 320 in order to be attached to an object or allow a notice 10 to be attached thereto through adhesive strengths of both sides.

The first side 310 is attached to various objects such as a wall or glass and has a first adhesive strength.

For example, the first adhesive strength of the first side 310 may be formed to not change according to season or time and not remain on a surface to which the first side 310 is adhered.

The second side 320 is attached to the notice 10 and has a second adhesive strength weaker than the first adhesive strength of the first side 310.

For example, the second adhesive strength of the second side 320 may be formed to allow the notice 10 to be attached and detached several times.

Here, since the first side 310 has an adhesive strength stronger than the adhesive strength of the second side 320, even when the notice 10 is detached, the first side 310 remains attached and fixed to the object.

Further, a bending piece 340 is formed on each corner of the second side 320 so that each corner of the second side 320 may be folded.

A bending line 350 is formed on the second side 320 so that the bending piece 340 may be folded in a triangular shape.

As the bending piece 340 is folded, the bending piece 340 is attached to a corner of the notice 10 adjacent thereto and fixes the notice 10.

Here, the bending piece 340 has a cutting line 360 formed to be cut from a corner to the center of the bending line 350 to firmly fix the notice 10 when an adhesive strength is reduced due to frequent replacement of the notice 10.

When an adhesive strength is reduced, one side portion of the bending piece 340 that is cut by the cutting line 360 is folded first, and the other side portion is folded to overlap with the one side portion, and thus the bending piece 340 is firmly fixed by being adhered with the first adhesive strength of the first side 310 of the one side portion.

Also, a protrusion may be formed on one side and the other side of the first side 310 that are cut by the cutting line 360 and may allow the first side 310 with the first adhesive strength stronger than the second adhesive strength to be easily detached.

Meanwhile, the bending piece 340 may be formed at positions corresponding to each corner of the plurality of posted notices 10 in addition to being formed at the corners of the second side 320.

A bulletin board 400 using the tape 300 having different adhesive strengths on both sides according to the present embodiment includes the tape 300 and includes a plate 410.

On the plate 410, the tape 300 is attached to positions spaced apart at a predetermined distance in the vertical direction along the transverse direction.

Here, as pieces of the tape 300 are spaced apart in the vertical direction, an upper end and a lower end of the notice 10 are attached thereto.

Also, on the plate 410, pieces of the tape 300 spaced apart in the vertical direction may be further attached in the vertical direction.

Here, since a plurality of pieces of the tape 300 are disposed in the vertical direction, a plurality of notices 10 may be posted in the longitudinal direction as well as the transverse direction.

Further, on the plate 410, a seating groove 411 is formed at a position to which the tape 300 is attached, so that the tape 300 may be seated thereon.

Since the tape 300 is seated on the seating groove 411, when the notice 10 is attached to the tape 300, there is no gap with the plate 410, and thus the notice 10 is in close contact therewith and firmly fixed.

A guide 412 having a triangular shape protrudes at a position on the seating groove 411 that faces the bending piece 340.

Here, when the tape 300 is attached to the seating groove 411, the bending piece 340 protrudes due to the protruding guide 412.

Accordingly, there is an effect of making it easy for the user to bend the bending piece 340.

According to a tape having different adhesive strengths on both sides and a bulletin board using the same according to the present disclosure, using the tape having different adhesive strengths on both sides, a first side with a stronger adhesive strength is attached to an object, and a notice is attached to a second side with a weaker adhesive strength, and thus there is an effect that the tape can be attached to various objects to post a notice.

Also, pieces of the tape are attached to the bulletin board while being spaced apart from each other in the vertical direction to fix an upper end and a lower end of the notice, and thus there is an effect of allowing the notice to be firmly fixed and promptly attached or detached.

Those of ordinary skill in the art to which the present disclosure pertains should understand that the present disclosure may be embodied in other specific forms without changing the technical spirit or essential features thereof. Therefore, the embodiments described above should be understood as illustrative, instead of limiting, in all aspects. The scope of the present disclosure is shown by the scope of the appended claims rather than the detailed description, and all changes or modifications derived from the meanings and scope of the claims and equivalent concepts thereof should be construed as belonging to the scope of the present disclosure.

DESCRIPTION OF REFERENCE NUMERALS

10: notice
100: tape
110: first side
120: second side
200: bulletin board
210: plate

The invention claimed is:

1. A bulletin board comprising:
    a tape having different adhesive strengths on both sides that is used to attach a notice to an object through an adhesive strength;
    a plate on which the tape is attached to positions spaced apart at a predetermined distance in a vertical direction along a transverse direction of a front surface of the plate and on which the notice is attached at equal intervals on the tape,
    wherein the tape comprises:
    a first side attached to the object through a first adhesive strength; and
    a second side which has a second adhesive strength weaker than the first adhesive strength and to which the notice is attached.

2. The bulletin board of claim 1, wherein, as the tape, a pair of pieces of tape spaced apart from each other in the vertical direction are further attached in the vertical direction.

3. The bulletin board of claim 1, wherein a bending piece is formed on each corner of the second side in order to be bent and attached to each corner of the notice adjacent thereto.

4. The bulletin board of claim 1, wherein a seating groove is formed on the front surface of the plate to enable the tape to be seated.

* * * * *